United States Patent
Fisli

[11] Patent Number: 5,412,501
[45] Date of Patent: May 2, 1995

[54] SYSTEM FOR CONTROLLING SPOT POWER IN A RASTER OUTPUT SCANNER

[75] Inventor: Tibor Fisli, Los Altos Hills, Calif.
[73] Assignee: Xerox Corporation, Stamford, Conn.
[21] Appl. No.: 153,693
[22] Filed: Nov. 17, 1993
[51] Int. Cl.⁶ .............................................. G02F 1/11
[52] U.S. Cl. .................................. 359/286; 250/205; 250/236; 359/196; 359/305; 358/494; 358/496
[58] Field of Search ............... 359/201, 217, 218, 285, 359/286, 287, 305; 250/205, 236; 358/494, 496

[56] References Cited
U.S. PATENT DOCUMENTS

| | | | |
|---|---|---|---|
| 4,170,028 | 10/1979 | De Benedictis et al. | 359/217 |
| 5,151,586 | 9/1992 | Sato et al. | 250/205 |
| 5,208,456 | 5/1993 | Appel et al. | 359/217 |

*Primary Examiner*—Loha Ben
*Assistant Examiner*—Suma N. Ramaswamy

[57] ABSTRACT

The present invention is a scanning system and a novel method for compensating for the variations in the output power of the beam from an A-O cell. The novel method involves varying the amount of drive current through the laser diode in such a fashion as to compensate for the loss of power due to diffraction inefficiencies. The amount of driving current is dependent upon the amount of power desired in the output beam from the A-O cell. The system and method of the present invention sets the output power from the A-O cell to a desired value. As the diffraction efficiency increases at other portions of the scan, the drive current is cut appropriately to compensate for the increased efficiency; thus keeping the output spot power at the desired value. Likewise, as the diffraction efficiency decreases at other portions of the scan, the drive current should be increased to compensate for the decrease in efficiency; thereby maintaining the desired value.

8 Claims, 5 Drawing Sheets

SYSTEM FOR CONTROLLING SPOT POWER IN A RASTER OUTPUT SCANNER

FIELD OF THE INVENTION

The present invention relates in general to a scanning system and a method of controlling spot power in a facet tracking raster output scanner (ROS) system and in particular to controlling the spot power produced by laser diodes in a facet tracking ROS system.

BACKGROUND OF THE INVENTION

Facet tracking ROS systems are generally well known in the art. The input beam of a laser source is deflected by an acousto-optic (A-O) cell in such a manner that the light beam moves to "track" the effective mirrored facet on a rotating polygon. In addition to deflection, the A-O cell may also modulate the input beam in response to a video data signal input.

As is also well known, the Bragg condition must be satisfied in order for the light to be diffracted by the A-O cell. Briefly, the Bragg condition states that the sine of the angle defined by the input light beam and the acoustic plane wave in the A-O cell must be equal to a multiple of the wavelength of light divided by two times the wavelength of the acoustic wave. If the angle of the incident light does not satisfy the Bragg condition, then the light will pass through with only partial diffraction.

In practice, the light that is at an incident angle close to the Bragg angle will be mostly diffracted. In most ROS systems, however, the angle of incidence for the input beam is constant. Only the frequency of the acoustic wave varies; thus varying the Bragg angle. As a result, there is one acoustic frequency that gives the optimal diffraction (i.e. where the Bragg condition is exactly satisfied) and a narrow band of frequencies, close to the optimal frequency, where light is partially diffracted, albeit at different angles of deflection.

One desirable result of this arrangement is that the differences in angle of deflection allow the beam to track the facet. A second result is that the partial diffraction of light reduces the power of the beam leaving the A-O cell. This second result is undesirable from the standpoint of print quality. For example, uneven spot power incident upon a photoreceptor ultimately places a limit on the latent image contrast of the xerographic system. This is especially true if photoreceptors are potentially sensitive to the variations in spot power that occurs due to diffraction inefficiencies.

One attempt to correct this spot power differential due to diffraction inefficiency has been to "steer" the sound beam so that it maintains the Bragg angle with the incident light as the acoustic frequency is varied. The steering is accomplished by generating the acoustic wave with a phased array of multiple transducers coupled to the single A-O cell. This approach, however, is costly and complex as it requires additional electronics to drive the multiple transducers to accurately steer the sound wave.

Thus, there is a need to compensate for the power variation from the output beam from an A-O cell due to the variations in diffraction efficiency without the use of multiple transducers in an A-O cell.

It is therefore the object of the present invention to provide a means for controlling the spot power of the output beam without adding to the complexity of the optical system.

It is yet another object of the present invention to provide a means for having any desired output spot power at any time during the scan.

SUMMARY OF THE INVENTION

In summary, the present invention is a scanning system and a novel method for compensating for the variations in the output power of the beam as it emerges from the A-O cell in systems employing laser diodes as the light source. The novel method involves varying the amount of drive current through the laser diode in such a fashion as to compensate for the loss of power due to diffraction inefficiencies. The amount of driving current is dependent upon the amount of power desired in the output beam from the A-O cell.

The system and method of the present invention sets the output power from the A-O cell to a desired value. As the diffraction efficiency increases at other portions of the scan, the drive current is cut appropriately to compensate for the increased efficiency; thus keeping the output spot power at the desired value. Likewise, as the diffraction efficiency decreases at other portions of the scan, the drive current should be increased to compensate for the decrease in efficiency; thereby maintaining the desired value.

One advantage of the present invention is simplicity in the design of the optical system. The present invention uses a simple A-O cell with one transducer in its optical system—there is no need for a more complicated device. Instead, the present invention alters the drive current to the laser diodes directly to compensate for variations in diffraction efficiency. Once the current settings are calibrated against the desired power output at all positions of the scan, the system may follow that power curve without adjustment.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 1:
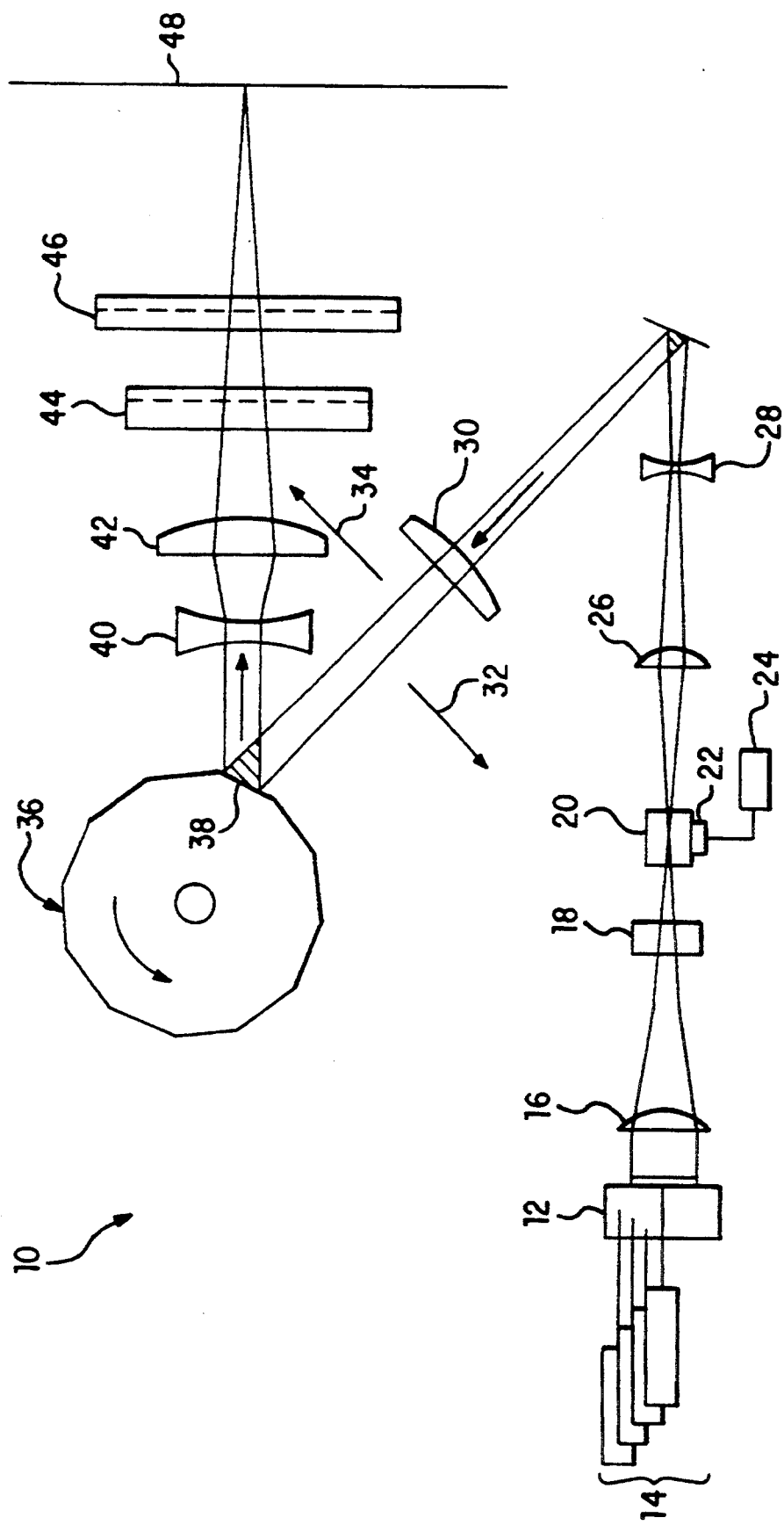
FIG. 1 is a tangential view of a presently preferred raster output scanning system employing facet tracking.

The methods of the present invention will now be discussed in reference to a given ROS system. It will be appreciated, however, that the principles of the present invention are not limited to any particular system and are applicable to any system having laser diodes as its light source and an A-O cell for deflection. Referring now to FIG. 1, a tangential view of the optical path of a presently preferred embodiment 10 is shown. The light source of the system 10 is a quad-pack of laser diodes 12 with each diode positioned preferably on top of one another in the sagittal plane (as seen clearly in FIG. 2). Each diode is driven by one of the dedicated drivers 14. Modulation of the diode may be accomplished by switching the current to the diode on and off according to input video data.

It will be appreciated that various configurations of laser diodes are well known in the art and that the present invention should not be limited to the particular quad-pack configuration disclosed in the presently preferred embodiment. In fact, the principles of the present invention apply with equal force to systems having a single laser diode. Additionally, the modulation of the light beams may be accomplished by the A-O cell instead of directly modulating the light at the source.

As the light emanates from laser diodes 12, the light is focused onto A-O cell 20 by cylindrical lenses 16 and 18. A-O cell 20 is driven by a single transducer 22 which, in turn, is driven by a single driver 24 that smoothly induces the input beams to deflect through an angle to maintain proper facet tracking. The path of beam deflection is depicted as moving along tracking arrow 34 and return arrow 32. It will be appreciated that the method of maintaining a proper angle and subsequent parallel beam displacement for facet tracking is well known in the art.

After the light beams have been deflected by A-O cell 20, the beams are focused in the sagittal meridian onto effective facet 38 by spherical lens 26, cylindrical lens 28, and spherical lens 30. The effective facet is caused to move through an angular and translational displacement as polygon 36 rotates. Facet tracking insures that the beams stay centered on the facet throughout all positions in which the facet may effectively reflect light to the photoreceptor 48.

After the light is thus reflected, the beams are again focused by cylindrical lenses 40 and 42, negative cylindrical lens 44 and concave cylindrical mirror 46. The focused beams impinge upon the surface of photoreceptor 48 to produce the effective "writing" of the system.

Figure 2:
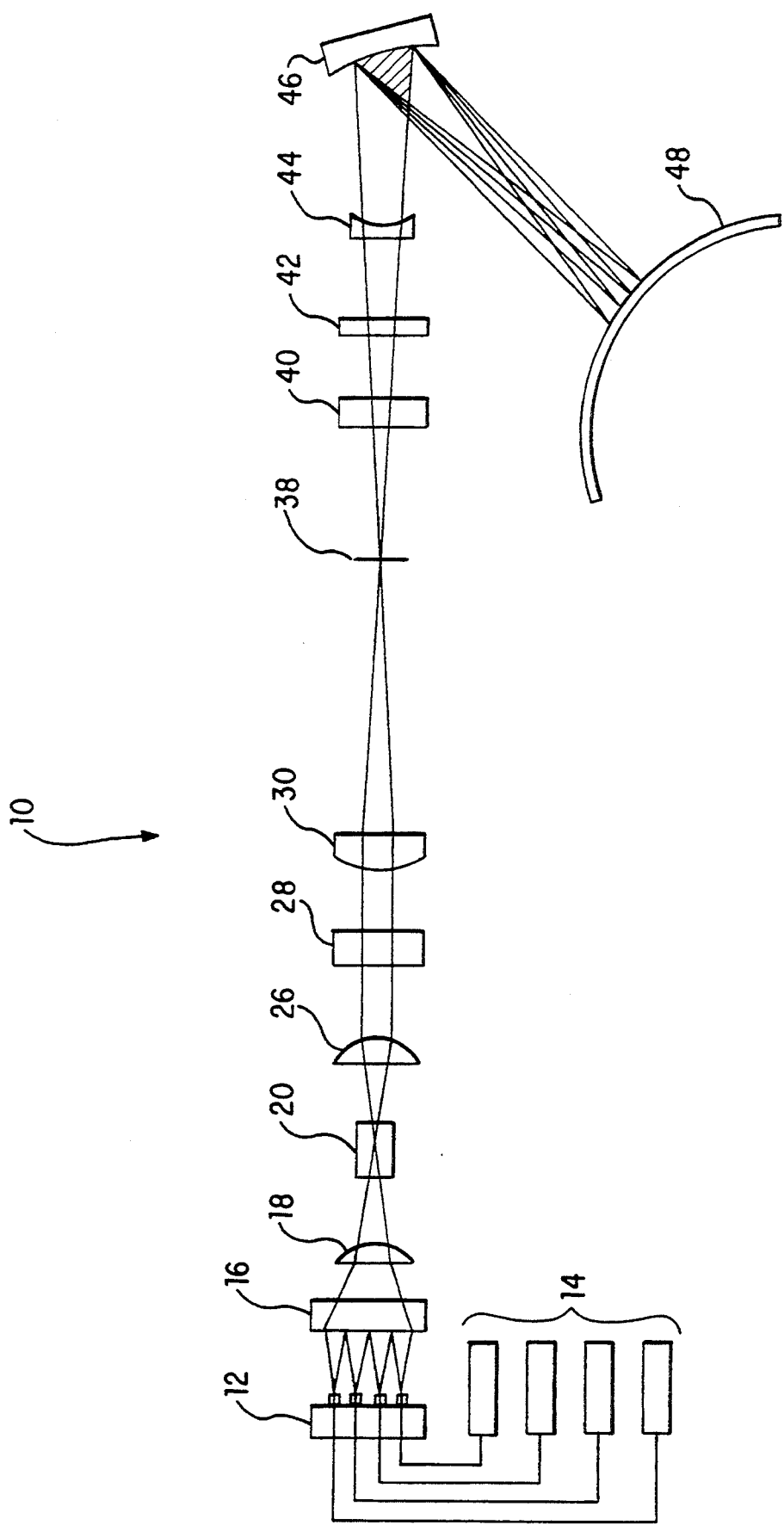
FIG. 2 is a sagittal view of the ROS system shown in FIG. 1.

A sagittal view of a presently preferred embodiment 10 is shown in FIG. 2. As can be seen from this view, the laser diodes are positioned so that their beams ride on top of each other in this plane. Dedicated drivers 14 are coupled to individual diodes 12 to provide individual addressability. Also seen, the four light beams image the photoreceptor surface 48 on top of each other.

Figure 3:
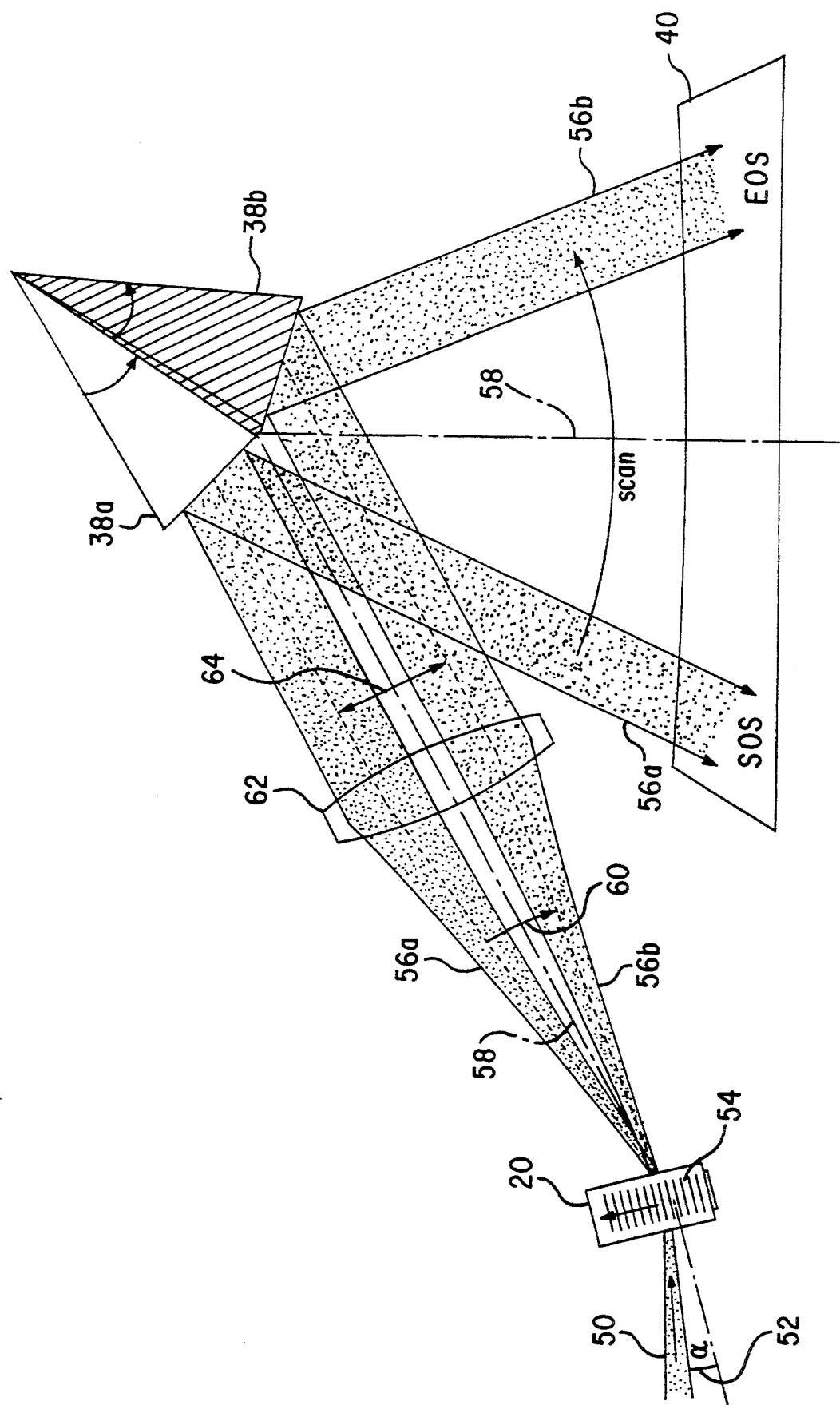
FIG. 3 is a simplified depiction of facet tracking using a single A-O cell. The light beam is shown in FIG. 3 at two separate positions in the course of a scan.

A simplified depiction of facet tracking using a single A-O cell is shown in FIG. 3. The incident light beam 50 impinges on the A-O cell 20 at a constant angle 52. The incident beam is deflected according to the acoustic wave 54 that is present in the A-O cell at the time of incidence. FIG. 3 depicts two separate times by the positions 56a and 56b of the light beam that represent "Start of Scan" (SOS) and "End of Scan" (EOS) respectively. The dotted line 58 represents the center of the beam during the Center of Scan.

Start of Scan beam 56a passes through lens 62, strikes the polygon facet 38a, and reflects off towards output optics 40. End of Scan beam 56b passes through lens 62, strikes the polygon facet 38b (which is the same facet as 38a except at a later time), and reflects off towards output optics 40.

Beams 56a and 56b represent the extremes in the positioning of the output beam from A-O cell for normal facet tracking. As previously mentioned, the angular displacement 60 is induced by varying frequency of the acoustic wave in the A-O cell 20. Lens 62 transforms the angular displacement of the output beams into a translational displacement 64 which is the displacement needed to track the moving facet through the entire scan.

Normally, the optical system is constructed so that the acoustic frequency that produces the Center of Scan deflection angle in the A-O cell is close to the Bragg angle. Thus, the diffraction efficiency, hence output spot power, is maximal at the Center of Scan line. The angles that are off Center of Scan are not at the Bragg angle; and consequently, suffer lower spot output power due to diffraction inefficiency.

Figure 4:
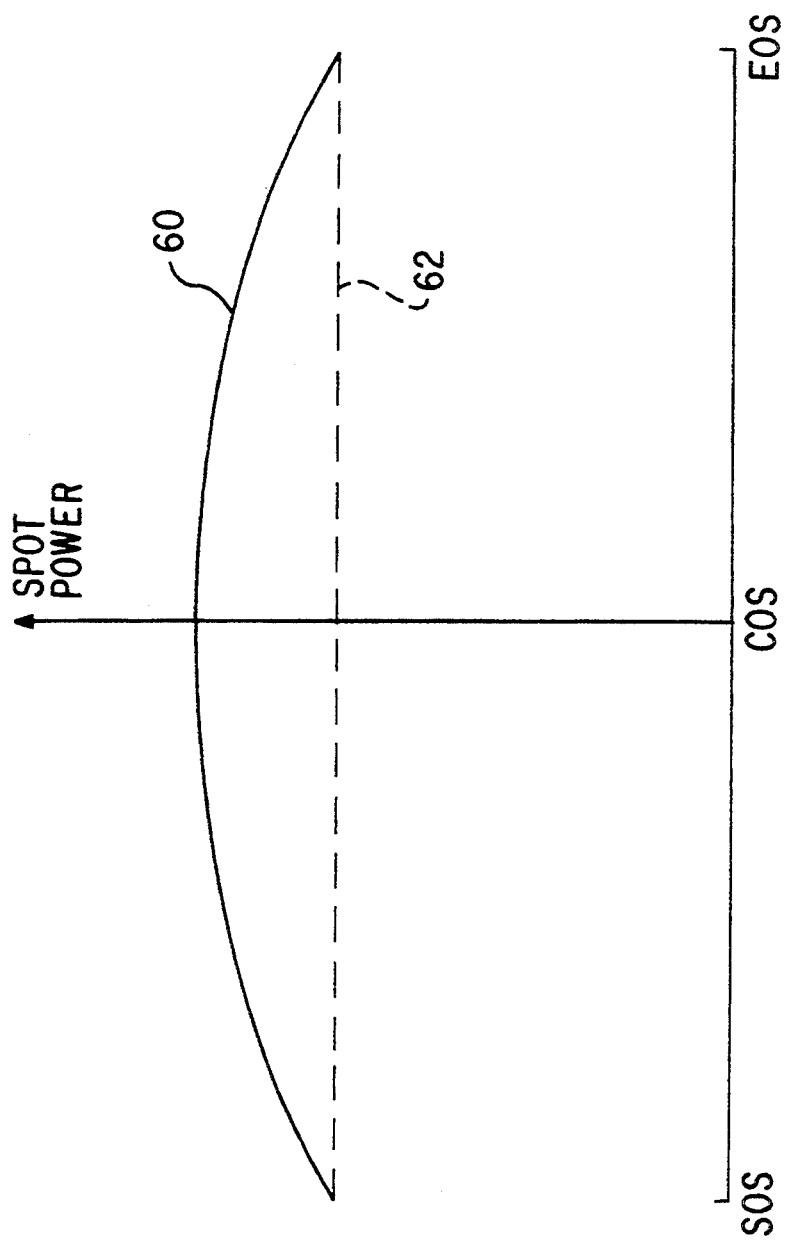
FIG. 4 shows the relationship between spot power incident upon the photoreceptor as a function of scan position.

The relationship between output spot power and scan position is depicted in FIG. 4. The solid curve 60 shows graphically this relationship in a typical ROS system where the output power of the light source is constant. Curve 60 is a convex curve with its maximum at the Center of Scan position because the associated acoustic frequency admits the input beam as close to the Bragg angle as possible. Curve 60 is seen curving downward symmetrically to either side to minimums at the Start of Scan and End of Scan positions.

The ideal curve from the standpoint of print quality is the dotted line 62. Dotted line 62 is a constant curve such that for all scan positions, spot power is constant. Although the dotted line 62 of FIG. 4 depicts the constant value as the minimum value of the solid curve 60, it will be appreciated that any constant value below breakdown of the laser diode may be chosen. One way to produce this ideal curve is to vary the output power of the light source inversely to the diffraction efficiency as produced by the ever changing Bragg angle. For example, where diffraction efficiency is higher, output power of the light source should be lowered appropriately. Likewise, where diffraction efficiency is lower, the output power of the light source should be raised appropriately.

As previously mentioned, power curve 60 is produced by a light source that has a constant output power. This is typical in a system that has a gas laser as its light source. Gas lasers have a comparatively slow response time as to variations in its driving current and its output beam power. By comparison, laser diodes have a very quick response time. As the driving current to the diode is varied, the output power of the laser diode responds rapidly. Thus, laser diodes are an ideal light source for the purposes of the present invention—a light source whose output must vary continuously through the various scan positions of the beam.

Figure 5:
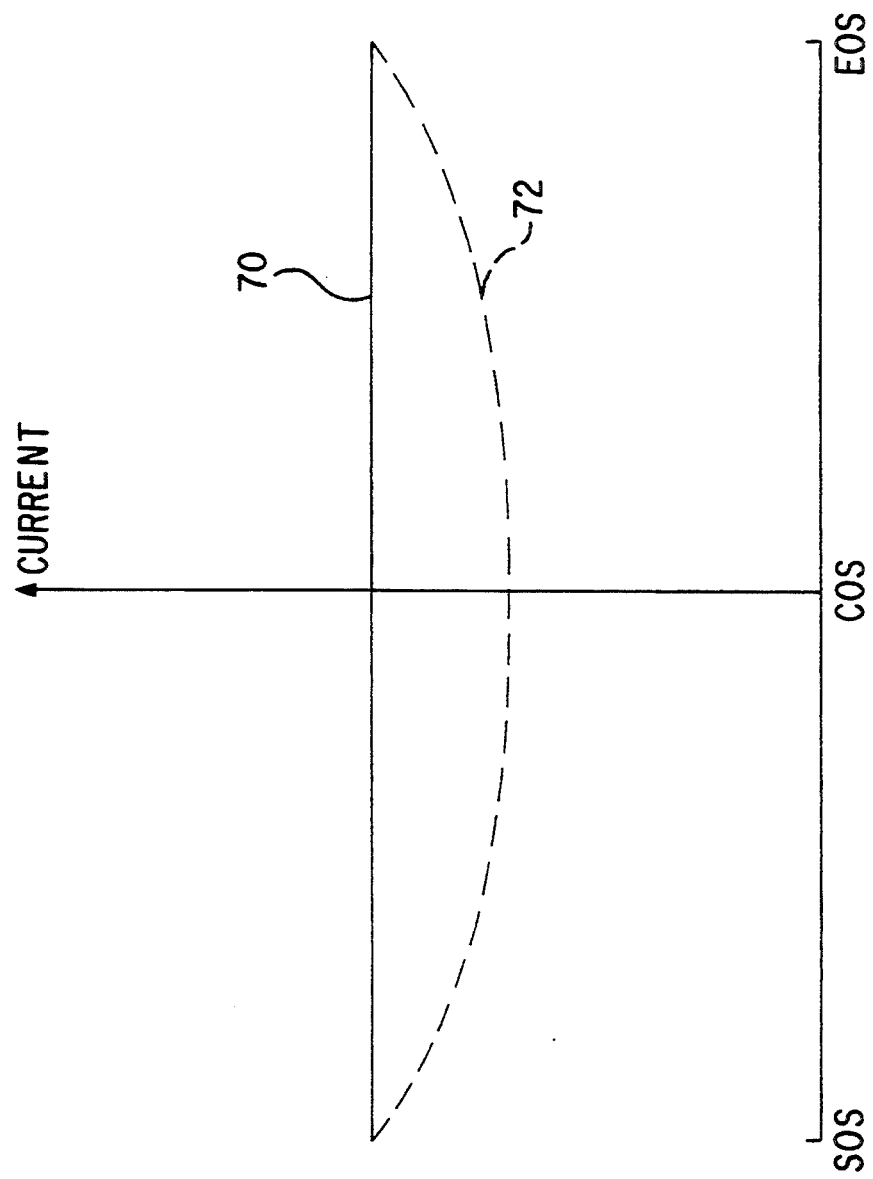
FIG. 5 depicts a theoretical desired output power curve for the laser diode to compensate for the variations due to diffraction inefficiencies.

FIG. 5 shows the relationship between driving current versus scan position that would be required to effect the ideal curve. Constant curve 70 is the driving current curve that would produce the solid curve 60 in FIG. 4. Constant current produces a constant output power; thus, spot power varies over the course of the scan due to changes in diffraction efficiency.

Dotted curve 72; however, is the curve that would produce the ideal curve 62 in FIG. 4. Curve 72 is concave to match the changes in the diffraction efficiency of the A-O cell. As diffraction efficiency increases, the driving current to the diode is decreased accordingly to maintain a constant spot power. Likewise, as diffraction efficiency decrease, the driving current is increased accordingly.

It will be appreciated that an initial calibration step may have to be performed in order to plot exactly the current curve 72 that produces the constant output curve 62. This could be accomplished by sampling the laser diodes off of a production run and actually varying the current to find the precise value for each position in the course of a complete scan. It will be appreciated that techniques for appropriate sampling and calibration are well known to those skilled in the art.

What is claimed:

1. A scanning system that provides spot power of a desired value, said system comprising:
   an input light source for emitting a light beam;
   an acousto-optic cell having an input and output side through which said light beam from said source propagates;
   a transducer coupled to said acousto-optic cell, said transducer generating an acousto wave that propagates through said cell, said acoustic wave interacting with said light beam such that said light beam is diffracted through a varying angle and with varying efficiency determined according to the frequency of said acoustic wave; and
   a driver providing energy to said light source, the power of said light beam being responsive to the amount of said energy provided by said driver, wherein the amount of energy provided to said light source is varied according to the varying efficiency of said acousto-optic cell to produce a beam on the output side of said acousto-optic cell of said desired value.

2. The scanning system as recited in claim 1 wherein said input light source is a laser diode.

3. The scanning system as recited in claim 2 wherein said energy provided by said driver is an electrical current.

4. The scanning system as recited in claim 1 wherein said desired value is a constant value for all angles of diffraction.

5. A method for providing a beam of spot power having a desired value throughout all scan positions in a scanning system having an input light source for emitting a light beam, an acousto-optic cell having an input and an output side, and a transducer generating an acousto wave that propagates in said acousto-optic cell, said acousto wave interacting with said light beam such that said light is diffracted through a varying angle and with varying efficiency determined according to the frequency of said acousto wave, said method comprising:
   providing energy to said light source wherein the power of said light beam is responsive to the amount of said energy provided by said driver; and
   varying the amount of energy to said light source according to the varying efficiency of said acousto-optic cell such that said beam on the output side of said acousto-optic cell is of said desired value.

6. The method as recited in claim 5 wherein said input light source is a laser diode.

7. The method as recited in claim 6 wherein said energy provided by said driver is an electrical current.

8. The method as recited in claim 5 wherein said desired value is a constant value for all angles of diffraction.

* * * * *